United States Patent
Barz et al.

[19]

[11] Patent Number: 6,103,341
[45] Date of Patent: Aug. 15, 2000

[54] SELF-SEALING PARTITION

[75] Inventors: William Barz, Shelby Township; Thomas L. Coon, Lapeer; Michael Czaplicki, Rochester, all of Mich.

[73] Assignee: L&L Products, Romeo, Mich.

[21] Appl. No.: 08/987,169

[22] Filed: Dec. 8, 1997

[51] Int. Cl.[7] .............................. F16J 15/14; B32B 5/16; B65D 53/06
[52] U.S. Cl. ......................... 428/147; 428/143; 428/122; 428/83; 428/358; 428/304.4; 428/192; 52/309.4; 52/309.8; 52/309.11; 296/203.01; 277/605; 277/617; 277/627; 277/626; 277/630; 277/650
[58] Field of Search .................................. 428/143, 147, 428/122, 83, 358, 304.4, 192; 52/309.4, 309.8, 309.11; 296/203.01; 277/605, 617, 627, 626, 630, 650

[56] References Cited

U.S. PATENT DOCUMENTS

| | | | |
|---|---|---|---|
| 4,751,249 | 6/1988 | Wycech | 521/54 |
| 4,810,548 | 3/1989 | Ligon et al. | 428/71 |
| 4,901,395 | 2/1990 | Semrau | 16/2 |
| 4,946,737 | 8/1990 | Lindeman et al. | 428/283 |
| 5,040,803 | 8/1991 | Cieslik et al. | 277/12 |
| 5,072,952 | 12/1991 | Irrgeher et al. | 277/229 |
| 5,382,397 | 1/1995 | Turner, Jr. | 264/46.5 |

FOREIGN PATENT DOCUMENTS

PCT/US96/07016   5/1996   WIPO .

*Primary Examiner*—William P. Watkins, III
*Attorney, Agent, or Firm*—Dobrusin Darden Thennisch & Lorenz PLLC

[57] ABSTRACT

A partition for forming a barrier in a channel has a molded resin-based plate and a plurality of thermally expandable pellets attached to one side of the plate. The partition is secured in place in the channel by mounting brackets. As heat is applied, a blowing agent in the pellets is activated and the pellets expand to many times their original volume. The resultant foam seals the gap between the plate and the surrounding structure and further secures the plate in place. The partition is particularly useful in forming a sound/water/air barrier in an automotive cavity.

14 Claims, 2 Drawing Sheets

SELF-SEALING PARTITION

TECHNICAL FIELD

The present invention relates generally to partitions in structural members and more specifically to self-sealing partitions for use in forming a barrier in a channel.

BACKGROUND OF THE INVENTION

Channels are often present in structural members such as automotive pillars and the like in which it is desirable to block out fumes, water, dust, and other materials as well as sound traveling along the channel. As will be appreciated by those skilled in the art, water, particularly if it contains road salt, may cause corrosion of metal surfaces. The problem of corrosion is especially acute where there is a gap in the various protective surface coatings that are typically applied to the metal. In addition, pillar channels may serve as pathways for air-borne dust and unwanted sound into the vehicle cavity.

A number of approaches have been taken to provide a suitable barrier for pillars and the like in the automotive industry. One such approach is described in U.S. Pat. No. 4,810,548 entitled, "Sandwich Seal Fixture." Therein, a barrier fixture is disclosed having an expandable foam material provided as a core between two registering flanking plates of relatively rigid material. Means are also provided by which the three components (plate-resin-plate) are held together. Mounting brackets are provided on the metal plates to allow the partition to be secured in position in a cavity. The fixture is sized with respect to a passageway to achieve ingress and egress to the passageway. After the fixture is mounted in place in a channel, sufficient heat is supplied to thermally activate a blowing agent in the core. As the core expands (foams) it extends out from the sides of the plates and forms a seal at the channel walls. In this manner a barrier or partition is formed in the channel.

Although the aforementioned fixture adequately forms the desired seal-in-place barrier, it suffers from several drawbacks. Most conventional sandwich fixtures of this type use metal as the plate material which adds weight to the fixture. As will be appreciated to those skilled in the art, due to fuel consumption goals, it is important to minimize weight wherever possible in motor vehicle manufacture. In addition to the weight factor, these conventional sandwich fixtures require assembly of three discrete parts. Also, the metal and the resin sheets must be cut to size and then secured together using some type of attachment means. The processing and assembly of the components are excessive.

It would be desirable to provide a self-sealing partition for use in blocking a channel which is light-weight when compared to conventional structures. It would also be desirable to provide a self-sealing partition which is an integral body of materials rather than a plurality of mechanically attached parts.

It is an object of the present invention to provide a lightweight, self-sealing partition for creating a barrier in a channel.

It is a further object of the present invention to provide a self-sealing partition which is a one piece integral body that does not require mechanical interlock of parts.

It is still a further advantage of the present invention to provide a self-sealing partition which does not require the use of metal fasteners and an intervening resin layer.

SUMMARY OF THE INVENTION

In one aspect, the present invention provides a cast or molded self-sealing barrier or partition which has a rigid resin-based body portion and an thermally expandable resin-based seal portion. The expandable seal portion includes a region near or at the outer perimeter of the rigid body. A mounting feature is provided on the body portion. The mounting feature is used to secure the barrier in place in a cavity such as the channel of a motor vehicle pillar. Installed in a pillar, the body portion has a configuration which closely matches the channel shape. Upon activation of the blowing agent, the thermally expandable portion expands and seals the gap between the channel walls and the rigid body, thereby sealing the barrier in place.

In another aspect, the thermally expandable portion comprises a plurality of expandable pellets. The pellets may be bonded to the surface of the rigid body through the use of an adhesive or they may be partially embedded in the surface of the body. The pellets may be embedded by placing them in the mold with the resin that forms the rigid body before the resin solidifies.

In still another aspect, the rigid body portion of the barrier is designed to minimize mass. A number of cavities are provided in the rigid body on the surface opposite that on which the expandable pellets are disposed to decrease weight.

In still another aspect the mounting brackets are integrally formed of the same material used to form the rigid body during the casting or molding process.

These and other objects, features and advantages of the invention will be more fully explained in connection with the detailed description of the preferred embodiments and in connection with the drawings.

DETAILED DESCRIPTION OF THE PREFERRED EMBODIMENTS OF THE INVENTION

Figure 1:
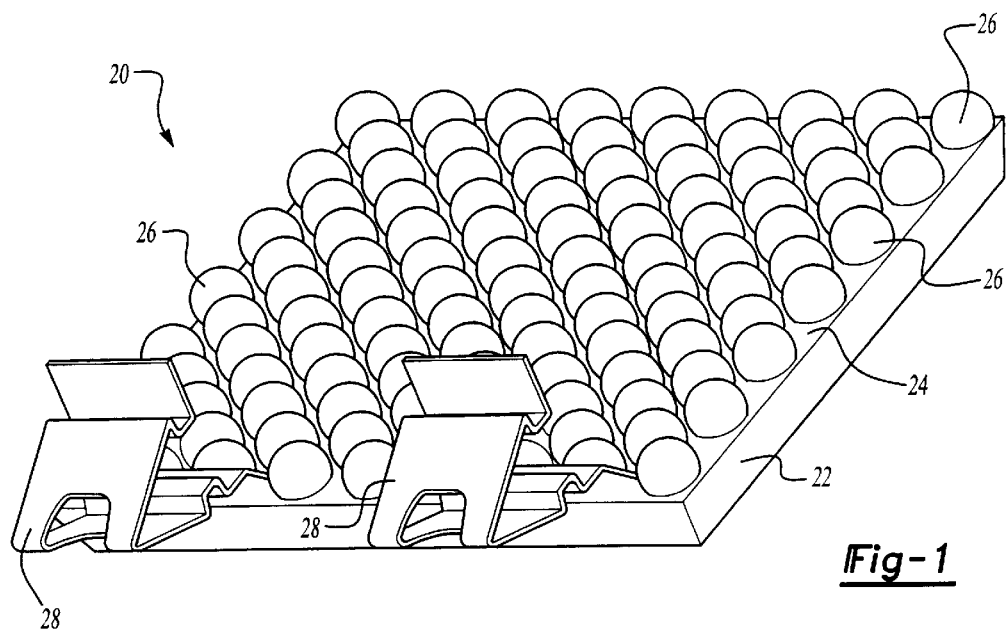
FIG. 1 is a perspective view of the self-sealing partition of the present invention illustrating the thermally expandable surface.

Referring now to FIG. 1 of the drawings, fixture or partition 20 has rigid body portion 22 shown in this embodiment as a generally square, thin plate. Body portion 22 has a principal surface 24 on which is disposed a plurality of expandable beads or pellets 26. Mounting brackets 28 are shown attached to one edge of body portion 22.

Figure 2:
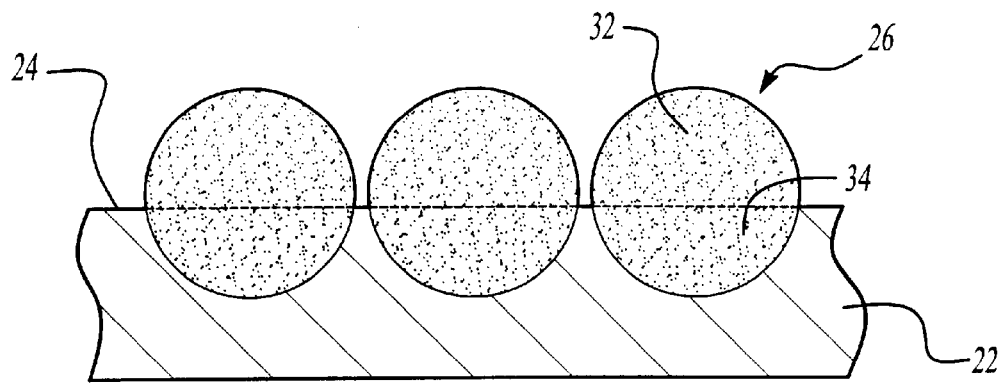
FIG. 2 is a side elevational cross section of the partition shown in FIG. 1 illustrating that the pellets as partially embedded in the partition body.

Turning now to FIG. 2 of the drawings, pellets 26 are shown in the most preferred embodiment as partially embedded in body 22. That is, each pellet 26 has a portion 32 which extends above surface 24 and an embedded portion 34 residing below surface 24. Although this partially embedded configuration is most preferred, other methods of attaching pellets 26 to body 22 may be desirable in a given application. For example, it may be sufficient in some applications to merely attach pellets 26 using an adhesive applied either as a coating to the pellets or as an adhesive layer on surface 24. Also, although pellets 26 are shown as symmetrically and closely packed on surface 24, pellets 26 will generally be more randomly dispersed with various degrees of packing density depending on the specific application.

It may be suitable in some applications to provide pellets 26 only along the perimeter of surface 24; that is, along the edges as a strip approximately 1 to 5 cm wide on surface 24 at the edges of body 22. Also, in an alternative embodiment the expandable portion of partition 20 could be formed by forming a strip or bead of a thermally expandable resin with a robot applicator or the like circumscribing the perimeter of body 22 on surface 24. It may be desirable to apply pellets 26 to both faces of body 22 and such construction is specifically contemplated herein.

In most instances, it is preferable that at least 60% of the available surface area of surface 24 be covered with pellets 26 and more preferably at least 80%. Also, in the embedded pellet embodiment it is preferred that on average at least 20 percent and more preferably 40 percent of each pellet 26 be embedded in body 22 to ensure that the pellets do not become dislodged during shipping and the like. The dimensions of pellets 26 are not critical and although spheres are illustrated in the drawings, other geometries such as ovals or the like are acceptable. The size of each pellet 26 is also not deemed critical but pellets having a diameter of from 1 to 10 cm will be suitable for most applications.

Body portion 22 is formed by casting or molding a resin in the desired shape. Casting is generally a molding process without the use of pressure; molding is more generally associated with the application of pressure to force the resin into the mold. For the purpose of the present application, the terms "mold" and "molding" shall be defined as encompassing casting as well as molding. The material from which body 22 is formed is, as stated, a resin-based material. It may be a thermoplastic or a thermoset resin. Suitable thermoplastics for use in forming body 22 are nylon (polyamide), and polysulfone. Suitable thermosets for use in forming body 22 are epoxy and vinyl ester.

Most preferred for use in forming body 22 in accordance with the present invention is a two-part thermoset epoxy resin which is cured. Numerous additives, such as curing agents and accelleratives which may be suitable in a particular application will be known by those skilled in the art based on the teachings herein. In order to further reduce weight, body 22 may be formed of a structural foam or include density reducers such as glass microspheres.

Pellets 26 are also formed of a resin-based material. Examples of resins suitable for use in forming pellets 26 are thermoplastics selected from the following group: ethylene vinyl acetate, ethylene methyl acrylate, EPDM, ethylene butyl acrylate, and various other ethylene copolymers or terpolymers. In addition, an important aspect of the present invention is that pellets 26 are thermally expandable. Accordingly, pellets 26 will contain one or more blowing agents which is thermally activated at a predetermined temperature. As used herein "blowing agent" will include any agent which produces the required expansion such as a chemical blowing agent or expandable plastic microspheres. The preferred blowing agents for use herein are preferably thermally activatable at a temperature of about 150 degrees C. Examples include Celogen OT™ (from Uniroyal) (pp oxybis benzene sulfonyl hydrazide) and Celogen AZ™ (from Uniroyal) (azodicarbonamide).

As stated, in the most preferred embodiment, pellets 26 are embedded in body 22 at surface 24. This is achieved most readily by pouring liquid resin into a mold and then adding the pellets to the resin. The relative densities of the body resin and pellets 26 should be such that the pellets are only partially submerged in the resin and do not sink to the bottom of the mold. In some instances it may be desirable to allow the resin to partially solidify in the mold and then press pellets 26 into surface 24 of body 22. After body 22 is solidified it is removed from the mold.

Figure 3:
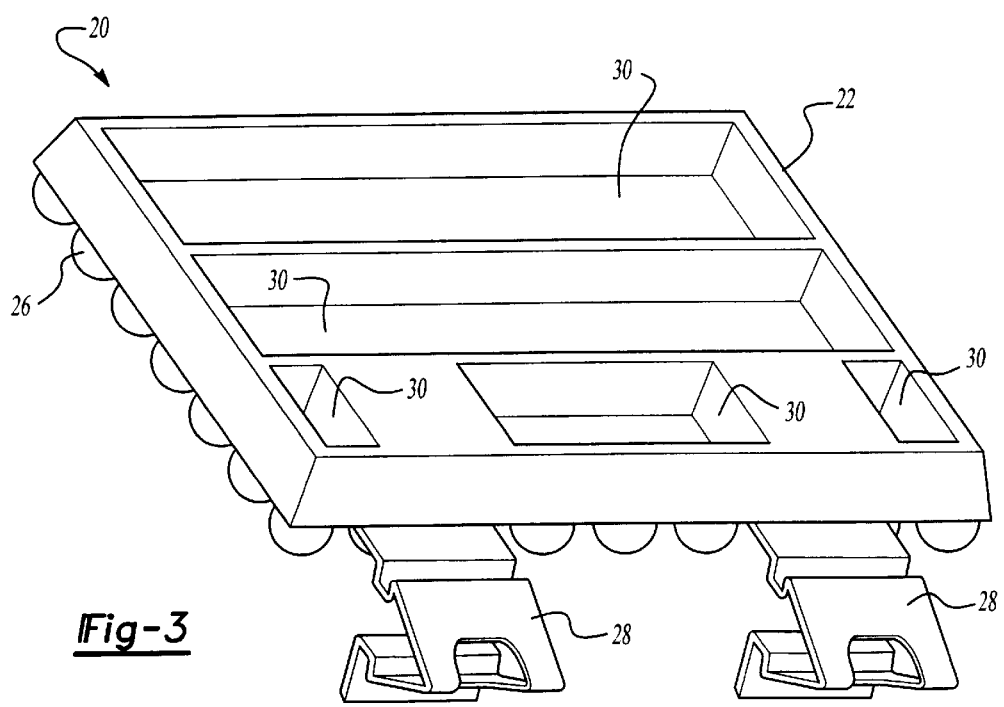
FIG. 3 is a perspective view of the partition shown in FIG. 1, but from the surface opposite that shown in FIG. 1.

As seen in FIGS. 1 and 3 of the drawings, mounting brackets 28 are provided as inserts in resin body 22. Of course, rather than being mold inserts, brackets 28 could be attached through an additional adhesive or through the use of a mechanical attachment such as screw or the like. In addition, although adding somewhat to the complexity of the mold, in one embodiment of the present invention mounting brackets 28 are formed of the same resin as used to form body 22. That is, the mold is designed such the mounting brackets are formed as part of body 22.

In order to further reduce the weight of partition 20, and referring now to FIG. 3 of the drawings, a number of voids or cavities 30 are seen in the surface of body 22 opposite that defined by surface 24. As will be appreciated by those skilled in the art, cavities 30 may be formed during molding by the appropriate mold design. By forming a plurality of voids rather than a single large void, greater structural integrity is provided by virtue of the resulting ribs.

Figure 4:
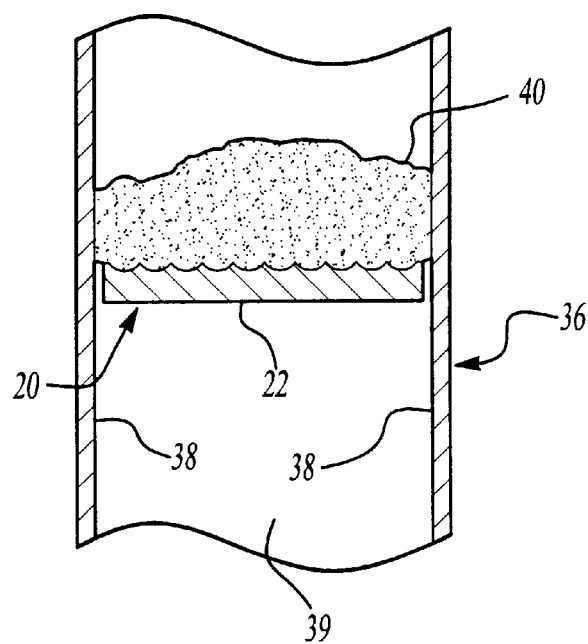
FIG. 4 is a fragmentary view of a partition made in accordance with the present invention as fully expanded in a channel.

In use, and referring to FIG. 4 of the drawings, partition 20 is used to form a barrier in a structural part such as pillar 36 by placing it in channel 39 defined by walls 38. The spacing between body 22 and walls 38, although shown as essentially mating contact, can vary rather widely which is an advantage of the present invention. After partition 20 is secured in position with mounting brackets 28 (not shown in FIG. 4), heat is applied such as when a motor vehicle is placed in a paint oven. Upon application of sufficient heat, foam 40 is formed by the expansion of pellets 26. It is preferred that the foam pellets expand to at least twice their original volume and more preferably to at least ten times their original volume. As they expand the resultant foamed plastic 40 seals the interface between body 22 and walls 38 thereby filling any gaps that may be present, and adhering strongly to walls 38. It is believed that the presence of foam 40 may add to the sound absorption characteristics of partition 20.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A self-sealing partition for creating a barrier in a passage, said partition comprising:

a rigid body formed of a resin-based material and having a principal surface, said principal surface having an outer perimeter; and a plurality of thermally expandable resin-based beads attached to said principal surface of said rigid body, said thermally expandable resin-based beads being positioned on said principal surface of said rigid body such that when said thermally expandable resin-based beads are thermally expanded they form a foamed mass which extends at least to said outer perimeter of said principal surface, said plurality of beads consisting of only a single layer of beads wherein each bead of said single layer is directly attached to said surface.

2. The self-sealing partition recited in claim 1, wherein said resin-based beads are at least partially embedded in said rigid body at said principal surface.

3. The self-sealing partition recited in claim 1, wherein said rigid body is formed of cured epoxy resin.

4. The self-sealing partition recited in claim 1, wherein said resin-based beads contain a thermally activated blowing agent.

5. The self-sealing partition recited in claim 1, wherein said resin-based beads are thermally expandable to at least twice their unexpanded volume.

6. The self-sealing partition recited in claim 1, resin-based beads are formed of an initially thermoplastic material that cures selectively during heat exposure.

7. The self-sealing partition recited in claim 1, wherein said rigid body is molded or casted.

8. The self-sealing partition recited in claim 1, further including mounting features attached to said rigid body.

9. The self-sealing partition recited in claim 1, wherein said foamed mass extends beyond said perimeter.

10. The self-sealing partition recited in claim 2, wherein less than ten percent by volume of each of said resin-based beads is embedded in said rigid body at said principal surface.

11. The self-sealing partition recited in claim 1, further including an adhesive disposed on said principal surface and wherein said beads are attached to said body by said adhesive layer.

12. The self-sealing partition recited in claim 1, wherein said beads expand when heated to a temperature of about 125–175 degrees C.

13. A structural member having a channel therein which is partitioned into two sections by a barrier, comprising:

a hollow structural member having an internal wall which defines a longitudinal channel;

a barrier disposed in said channel;

said barrier having a rigid resin body, said rigid resin body having a width and length greater than its thickness;

said body further having opposed planar surface;

a plurality of individual thermally expandable beads disposed on one of said opposed planar surfaces, said plurality of beads consisting of only a single layer of beads wherein each bead of said single layer is directly attached to said surface; and at least on connector mounted on said body and attached to said hollow structural member.

14. A self-sealing partition for creating a barrier in a passage, said partition comprising:

a rigid body formed of a cured epoxy resin and having a principle surface, said principal surface having an outer perimeter;

a plurality of thermally expandable resin-based beads partially embedded in said rigid body at said principle surface and covering the majority of said principle surface, said thermally expandable resin-based beads consisting of only a single layer of beads wherein each bead of said single layer is directly attached to said surface and having a thermally acivatable blowing agent such that when said thermally expandable resin-based beads are thermally expanded they form a foamed mass which extends beyond said perimeter; and a mounting bracket attached to said rigid body for mounting said rigid body in a channel.

\* \* \* \* \*